US005509046A

United States Patent [19]

Logan

[11] Patent Number: 5,509,046

[45] Date of Patent: Apr. 16, 1996

[54] COOLED WINDOW FOR X-RAYS OR CHARGED PARTICLES

[75] Inventor: Clinton M. Logan, Pleasanton, Calif.

[73] Assignee: Regents of The University of California, Oakland, Calif.

[21] Appl. No.: 300,772

[22] Filed: Sep. 6, 1994

[51] Int. Cl.[6] ........ G02B 5/00

[52] U.S. Cl. ........ 378/161; 250/505.1

[58] Field of Search ........ 378/161, 200, 378/199, 203, 140; 250/505.1; 313/36, 44, 420

[56] References Cited

U.S. PATENT DOCUMENTS 5,075,797 12/1991 Jones ........ 359/350

5,128,977 7/1992 Danos ........ 378/121

*Primary Examiner*—David P. Porta
*Assistant Examiner*—Don Wong
*Attorney, Agent, or Firm*—Henry P. Sartorio; L. E. Carnahan

[57] ABSTRACT

A window that provides good structural integrity and a very high capacity for removal of the heat deposited by x-rays, electrons, or ions, with minimum attenuation of the desired beam. The window is cooled by providing microchannels therein through which a coolant is pumped. For example, the window may be made of silicon with etched microchannels therein and covered by a silicon member. A window made of silicon with a total thickness of 520 μm transmits 96% of the x-rays at an energy of 60 keV, and the transmission is higher than 90% for higher energy photons.

20 Claims, 1 Drawing Sheet

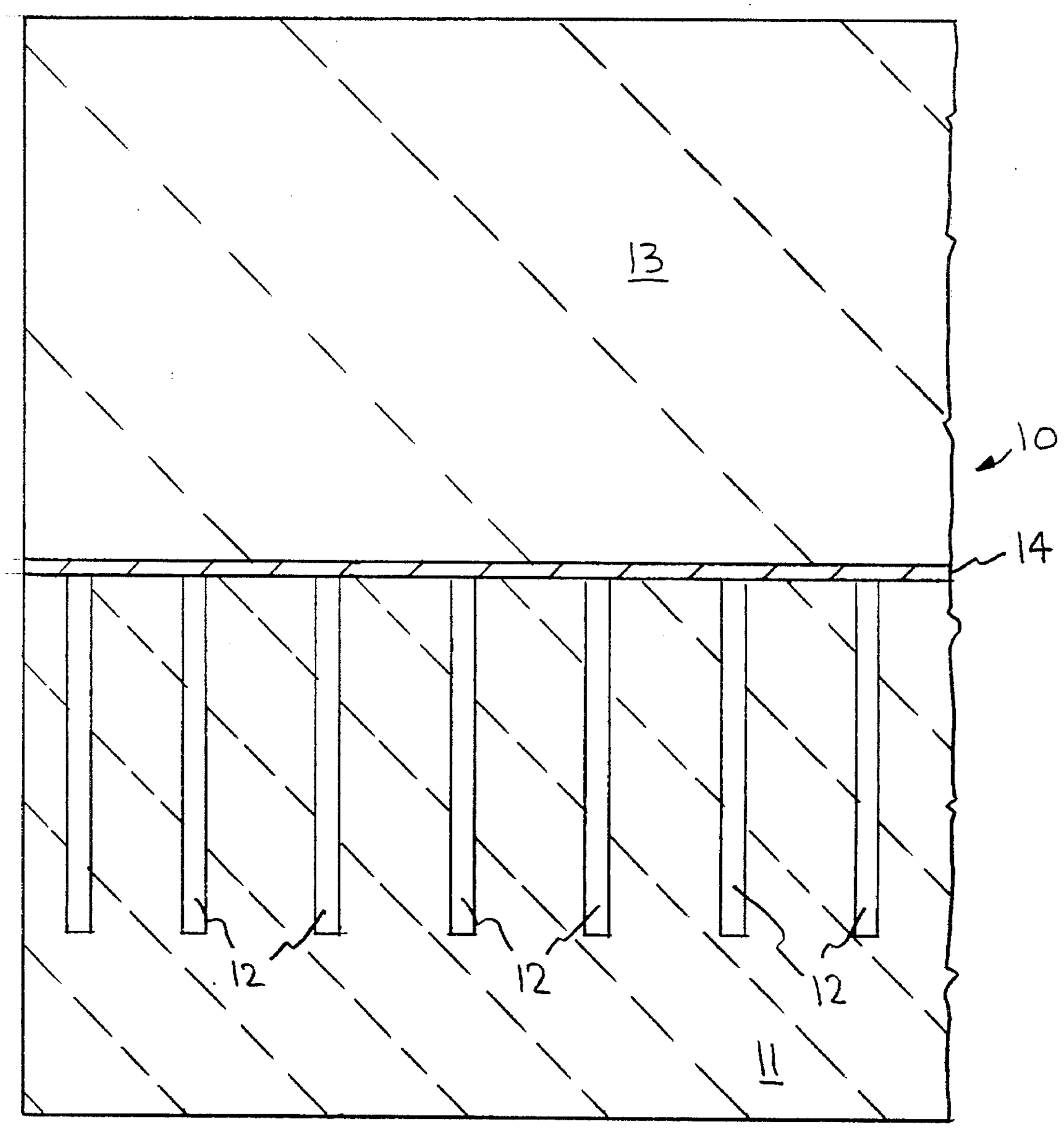
13
10
14
12
12
12
11

COOLED WINDOW FOR X-RAYS OR CHARGED PARTICLES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention is directed to windows for x-rays, electrons, ions, etc., particularly to windows for high output x-ray tubes and particle/electron accelerators, and more particularly to a cooled window capable of simultaneously supporting pressure differentials and dissipating thermal loads with negligible attenuation of the beam passing there through.

There are many applications that require windows for x-rays, electrons or ions, such as high output x-ray tubes and particle or electron accelerators. One example is a window into a beam dump for high energy electrons from accelerators. Another example is a window that provides a vacuum-tight barrier to prevent leakage of atmospheric gases into a sealed tube that is used to produce x-rays. These types of applications induce significant thermal load on the window, as well as producing a pressure differential across the window.

The most general commercial application is in high output x-ray tubes used, for example, in helical computed tomography. As an example of these various applications, U.S. Pat. No. 5,128,977 issued Jul. 7, 1992 to M. Danos describes a configuration for an enhanced output x-ray tube in which the accelerated electrons are impinged onto a rotating anode at an angle of about 10° to the anode surface, which is in contrast to the more common angle of 80°–90° , and such proportedly leads to a significant increase in the number of x-rays emitted. Unfortunately, the Danos configuration causes scattered electrons to impinge on the tube window causing melting thereof. Danos proposes two approaches to managing this difficulty: 1) locating the window out of line with the highest intensity of scattered electrons, and 2) deflecting the electrons with a magnetic field. By locating the window out of line with the scattered electron, x-ray intensity is compromised, and deflecting the electrons requires space to accommodate the magnet and beam dump within the tube.

Thus, there is a need for a window capable of withstanding the thermal load and pressure differential imposed thereon by applications involving high output x-rays tube, as well as particle and electron accelerators. That need if satisfied by the cooled window of this invention that offers good structural integrity and very high capacity for removal of the heat deposited by x-rays, electrons, or ions, and is accomplished while offering minimum attenuation of the desired beam.

SUMMARY OF THE INVENTION

It is an object of the present invention to provide a cooled window for x-rays or charged particles.

A further object of the invention is to provide a window capable of handling the thermal load from scattered electrons.

A further object of the invention is to provide a cooled window capable of supporting a pressure differential and dissipating a thermal load, with negligible attenuation of the desired beam passing there through.

Another object of the invention is to provide a window containing cooling microchannels that has structural integrity and a very high capacity for removal of heat deposited by x-rays, electrons, ions, etc., with minimum attenuation of the desired beam.

Another object of the invention is to provide a window for x-rays, electrons, or ions which is constructed of silicon and includes a plurality of coolant microchannels for dissipating heat.

Other objects and advantages will become apparent from the following description and accompanying drawing. The invention is basically a cooled window for x-rays or charged particles which is configured for handling a thermal load from scattered electrons, for example. More specifically, the invention involves a cooled window capable of simultaneously supporting a pressure differential of one atmosphere and dissipating a thermal load of 2 kW/cm$^2$, with negligible attenuation of the desired x-ray beam. The window includes a plurality of microchannels through which is pumped a coolant for removal of the heat deposited by x-rays, electrons, or ions, while minimizing attenuation of the desired beam.

BRIEF DESCRIPTION OF THE DRAWINGS

The accompanying drawing, which is incorporated into and forms a part of the disclosure, illustrates an embodiment of the invention and, together with the description, serves to explain the principles of the invention.

The single FIGURE illustrates in cross-section an embodiment of the invention utilizing cooling microchannels formed in a substrate in accordance with the invention.

DETAILED DESCRIPTION OF THE INVENTION

The invention is a window that is capable of handling the thermal load from scattered x-rays, electrons or ions. The window offers good structural integrity and a very high capacity for removal of the heat deposited by x-rays, electrons, or ions. It accomplishes this while offering minimum attenuation of the desired beam. The cooled window of this invention is capable of simultaneous supporting a pressure differential, such as one atmosphere, dissipating a thermal load, such as 2 kW/cm$^2$, with negligible attenuation of the desired x-ray beam.

The window is formed using methods demonstrated for microchannel heat sinks, and may utilize, for example, anisotropic etching methods to produce deep, narrow slots, openings, grooves, or microchannels in a substrate, such as a silicon (Si) wafer. However, if the substrate is composed of beryllium (Be), for example, ion beam milling could be used to form the slots or microchannels. The slots or microchannels (see FIG. 1 ) can be parallel, and under certain circumstances can be etched on one or both sides of the substrate (Si wafer). The thickness of the wafer or substrate is chosen so that acceptable transmission occurs for the particular application. Thus, a window for x-rays may be made of a different thickness and material than a window for charged particles, and may be different for various x-ray applications, such as mammography and chest radiology. The width and depth of the slots formed in a substrate and the distance between the slots will be determined primarily by the differential pressure there across and the amount of heat to be dissipated thereby.

The drawing illustrates an embodiment of a cooled window made in accordance with the present invention. The window, generally indicated at 10, is composed of a substrate 11, of silicon (Si), for example, having a plurality of parallel openings, microchannels, or slots 12 therein, and onto which is secured a cover or member 13, of silicon for example, by bonding or an adhesive layer 14. The thus formed microchannels or slots 12 define coolant passages through which a coolant, such as water, may be pumped and which carries away the thermal energy deposited in the substrate 11 by scattered electron, x-rays, etc.

By way of example, the substrate 11 and cover 13 may each have a thickness of 2601 μm and a combined thickness of 520 μm, with the thickness of the bonding layer 14 being minimal (1–5 μm) although shown substantially larger for clarity. The microchannels or slots 12 are etched 180 μm deep and 13 μm wide, for example, and are spaced apart at 65 μm. The substrate 11 may have a thickness of 50 to 1000 μm, with the cover 13 having a thickness of 50 to 1000 μm. The microchannels 12 may have a depth of 30 to 700 μm and a width of 10 to 200 μm, and spaced apart at 10 to 1000 μm. The slots 12 are preferred to have a depth of greater than one-half the thickness of the substrate 11 and a width less than about 1/15 of the slot depth. The substrate 11 and cover 13 may, in addition to silicon, be made of any x-ray, electron, or charged particle transparent material, depending on the application, such as beryllium (Be), carbon (C), aluminum (Al), copper (Cu), and selected polymers, such as Mylar and Kapton, made by DuPont, and Saran, made by Dow Chemical. Mylar is a strong polyester film. Kapton is a polymide film, and Saran is a copolymer of vinylidene chloride and vinyl chloride.

Currently, silicon (Si) is commercially available up to eight (8) inch diameter wafers, which are not large enough for some applications, such as a 18×24 window for mammography. In such cases the windows are put together in a mosaic, such as four rectangular pieces. The length of the microchannels or slots 12 should be as long as the substrate and are connected to a source of coolant for pumping same through the slots 12 for cooling the substrate 11 and cover 13.

By way of example, the cooled window may be fabricated by the following procedure:

Use a commercially available wafer of single crystal Si as the substrate 11 with the 110 crystal plane as the surface planes. These wafers are available in any desired thickness and with both sides polished (for etching from both sides). The crystalline orientation of the Si then allows deep features to be etched with side walls that are at 90.0 degrees to the 110 plane.

Form an etch mask of $Si_3N_4$. This can be done with standard methods. The layer should be about 1000 Å thick.

Produce the etch pattern by photolithograpy. This is best done by using a positive photo resist. This is typically a UV sensitive polymer. When the desired pattern is projected onto the resist and developed, the areas of the resist that have been exposed to UV are dissolved away. (A negative resist is made resistant to dissolution by the UV, so works in the opposite sense).

Transfer the pattern to the $Si_3N_4$ by plasma etching. Use an atmosphere of $CF_4$ with 3 percent $O_2$ added and a pressure of 500 mTorr. About 100 watt of RF power is required. Transfer time is about 5 min. This plasma etching removes the $Si_3N_4$ in the regions not protected by the resist. The resist is then removed by dissolution with acetone.

Etch the Si with KOH. This material will deepen the microchannels 12 at a rate about 600 times faster than it widens. This allows precise control of the final geometry. The rate of etching is strongly temperature dependent, proceeding at about 5 μm/hour at 350° C. and about 100 times faster at 70° C.

A final etch in HF removes the $Si_3N_4$ without attacking the Si.

The cover or member 13 is then secured to substrate 11 so as to be over the open ends of microchannels 12 to thereby form coolant passages. The cover 13 is secured to substrate 11 by any of several "bonding" processes, such as anodic bonding, direct fusion bonding, adhesives such as an epoxy, or by soldering or brazing, each considered to be a "bonding" technique. Anodic bonding of glass to silicon involves making the cover of a glass with a mobile ion constituent, such as Corning 7740, which contains mobile Na ions. The glass and silicon are cleaned and placed together in a vacuum or inert atmosphere. After heating to about 450° C., a negative voltage of about 1 keV is applied to the glass, which results in a strong reliable bond. Silicon can also be applied as the cover material by direct fusion bonding, wherein the Si surfaces are cleaned and pretreated to make them hydrophilic, and then heated to about 1000° C. to form a bond. In addition, the cover can also be applied using adhesives such as epoxy.

In the case of the substrate and cover being constructed from a metal, such as copper, the preferred method of applying the cover may be to use a bonding agent such as common solders and braze alloys. An interdiffusion layer may also be used to create a diffusion bond. This may be silver or gold when bonding copper.

A cover can also be applied by filling the microchannels with inert material such as wax or putty and depositing the cover by chemical, vapor, or electroplating methods.

The window 10 is mounted in an apparatus such as a high output x-ray tube and the microchannels 12 of substrate 11 are connected to a coolant source, and the coolant, such as water, is pumped through the microchannels 12 and carries away the thermal energy deposited in the substrate 11 and cover 13 by scattered electrons and other sources. If higher thermal loading is needed, the material of window 10 could be copper for certain applications.

A window 10 with a total thickness of 520 μm (substrate=250 μm and cover=250 μm) of Si transmits 96% of the x-rays at an energy of 60 keV. Photons with lower energy are not generally useful for computed tomography (CT) imaging. Window transmission for higher energy photos is even higher than 96%. X-ray beams for CT applications are usually filtered with Al to remove the very low energy x-rays. This is done to reduce the x-ray dose to the patient. The small filtering effect of the Si window would simply replace some of the intentionally added filtration.

It has thus been shown that the present invention provides an effective cooled window for x-rays or charged particles which is capable of simultaneously supporting a pressure differential of one atmosphere, dissipating a thermal load of 2 $kW/cm^2$, and with negligible attenuation of the desired x-ray beam. Thus, the invention has numerous applications such as in accelerators and x-ray tubes, as well as in x-ray imaging of the human body, especially in high performance x-ray tubes for spiral or helical computed tomography.

While a particular embodiment has been illustrated and particular materials and parameters have been set forth, as well as a specific fabrication sequence for making the cooled window, such is not intended to be limiting. Modifications and changes will become apparent to those skilled in the art, and it is intended that the invention be limited only by the scope of the appended claims.

What is claimed is:

1. A cooled window comprising:

a first member constructed of material substantially transparent to energy passing there through;

said first member being provided with at least one uninterupted longitudinally extending slot therein;

a second member constructed of material substantially transparent to energy passing there through;

said second member being secured to said first member so as to cover an open side of said slot;

said slot being adapted to being connected such that coolant passes there through for cooling said first and second members.

2. The cooled window of claim 1, wherein said first and second members are constructed of material substantially transparent to the passing of x-rays and charged particles there through.

3. The cooled window of claim 2, wherein said first and second members are constructed of material selected from the group consisting of silicon, beryllium, carbon, aluminum, copper, and selected polymers.

4. The cooled window of claim 3, wherein said at least one slot in said first member consists of a plurality of substantially parallel slots extending longitudinally across said first member.

5. The cooled window of claim 4, wherein said plurality of slots having a depth of at least one half of the thickness of said first member, and a width of less than about one-fifteenth of the depth thereof.

6. The cooled window of claim 5, wherein said second member has a thickness of not greater than a thickness of said first member.

7. The cooled window of claim 6, wherein said first member is constructed of silicon having a thickness of about 260 μm, and wherein said plurality of slots have a depth of about 180 μm and a width of about 13 μm.

8. The cooled window of claim 7, wherein said second member is constructed of silicon having a thickness of about 260 μm.

9. The cooled window of claim 3, wherein said first and second members are constructed of silicon.

10. A method for fabricating a cooled window for x-rays and charged particles, comprising:

providing a substrate composed of material substantially transparent to x-rays and charged particles;

forming a plurality of longitudinally extending microchannels in the substrate;

providing a cover member composed of material substantially transparent to x-rays and charged particles; and securing the cover member on substrate so as to cover the microchannels to form coolant passageways through the substrate.

11. The method of claim 10, wherein the cover member is secured to the substrate by bonding.

12. The method of claim 11, additionally including forming the substrate and cover member from material selected from the group consisting of silicon, beryllium, carbon, aluminum, copper and selected polymers.

13. The method of claim 10, wherein the plurality of uninterupted longitudinally extending microchannels are formed to have a depth greater than about ½ the thickness of the substrate and a width less than about 1/15 the depth thereof.

14. The method of claim 10, wherein the substrate and the cover member are composed of silicon.

15. The method of claim 14, wherein the plurality of microchannels are formed in the silicon substrate by etching with KOH.

16. The method of claim 15, wherein the silicon substrate is formed to have a thickness of about 260 μm, and wherein the microchannels have a depth of about 180 μm and a width of about 13 μm.

17. A cooled window for x-rays or charged particles, comprising:

a substrate;

a plurality of microchannels formed in said substrate; and a cover member secured to said substrate such that said microchannel form coolant passageways through said substrate;

said substrate and said cover member being constructed of material substantially transparent to x-rays and charged particles.

18. The cooled window of claim 17, wherein said substrate and said cover member are composed of silicon.

19. The cooled window of claim 18, wherein said microchannels have a depth of at least one-half the thickness of the substrate.

20. The cooled window of claim 18, wherein said substrate has a thickness of about 260 μm, and wherein said microchannels have a depth of about 180 μm and a width of about 13 μm.

* * * * *